Sept. 4, 1928.

H. J. BERRY 1,682,736

COMPRESSOR PISTON

Filed March 5, 1927

INVENTOR.

Henry J. Berry,

BY Edward N. Pagelsen

ATTORNEY.

Patented Sept. 4, 1928.

1,682,736

UNITED STATES PATENT OFFICE.

HENRY J. BERRY, OF DETROIT, MICHIGAN, ASSIGNOR OF ONE-THIRD TO CARL W. FLOSS, OF DETROIT, MICHIGAN.

COMPRESSOR PISTON.

Application filed March 5, 1927. Serial No. 173,081.

This invention relates to the construction of gas compressors, particularly to those employed in refrigerating machines, and its object is to provide a cylinder and piston construction for machines of this character with disk valves which may be turned over when worn on one side. A further object of this invention is to provide a cylinder lining and a safety head in direct contact with each other, the lining being provided with a projecting flange which may be refinished when worn. Another object of this invention is to provide a resilient mounting for the intake valve which is mounted on the piston so that the flow of gas through the piston during the suction stroke will be hindered to a minimum extent. Another object of this invention is to provide a guide and keeper for the piston valve which will permit free movement thereof and which will place no undue stresses on any part thereof.

These several objects are attained in the mechanism illustrated in the accompanying drawing, in which—

Similar reference characters refer to like parts throughout the several views.

Figure 1:
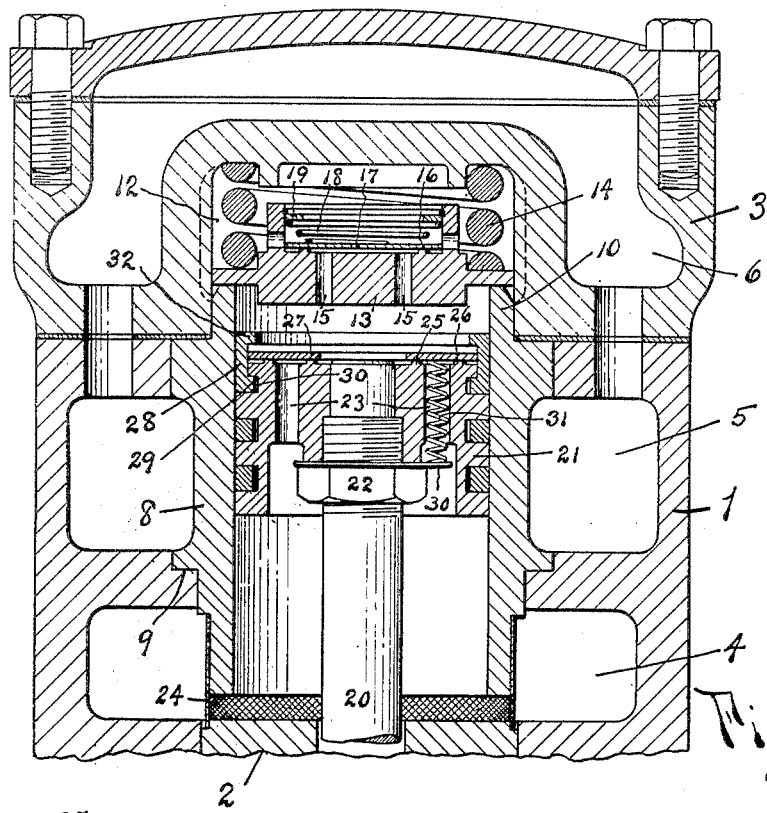
Fig. 1 is a central longitudinal section of a compressor cylinder and piston.
Figure 2:
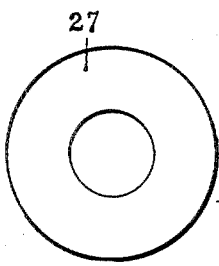
Fig. 2 is a plan of a valve for the piston.
Figure 3:
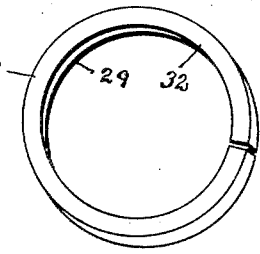
Fig. 3 is a retainer ring for this valve.

Fig. 1 shows the outer portion of a compressor cylinder 1 which has an inner head 2 and an outer head 3. The space 4 connects to the intake pipe or supply and the space 5 to any desired source of cooling water, this space 5 connecting to the space 6 within the outer head 3. Any desired means may be employed to secure the head 3 to the cylinder. Within the cylinder is a lining 8, preferably connecting gas tight to the cylinder along the surface 9, and having its outer end in the form of a flange 10.

The head 3 is formed with a chamber 12 to which the discharge pipe connects in any desired manner and within this head is mounted a safety head 13, held against the flange 10 by the spring 14. The engaging surfaces of this head and flange may be readily refinished, when worn, the removal of the head 3 alone being required to give access to these parts. The safety head has passage 15 surrounded by a circular seat 16 for the disk or wafer valve 17 which is held thereon by the light spring 18, which abuts against the retainer ring 19.

The piston rod 20 is screwed into the piston 21, a jamb-nut 22 being employed to lock them together. The piston has any desired number of passages 23 for the gas which flows into the cylinder from the chamber 4 through the screen 24 secured around the inner end of the cylinder lining, to these passages 23 on the downward or inward stroke of the piston. Two circular valve seats 25 and 26 are formed on the outer end of the piston and receive the valve 27, which is preferably quite thin. The valve is positioned and retained by a ring 28 sprung onto the piston and having an inner flange 29 fitting in a groove 30 in the piston and a second interior flange 32 extending over the valve 27. This ring also acts as the usual piston ring to prevent leakage around the piston.

It has been my experience with valves of this character, that notwithstanding their lightness, and in spite of the fact that they are made as hard as consistent with the necessary toughness, they wear in time. I have therefore made the outer diameter of the seat 26 on the piston less than the inner diameter of the flange 32 of the retainer ring 28. This permits this valve to be turned over to present a fresh surface to the seats 25 and 26. In the same manner, the end of the spring 18 in engagement with the discharge valve 17 is of less diameter than the seat 16.

When the pressure of the gas in the cylinder is low, the weight of the light suction valve 27 is sometimes sufficient to interfere with the action of the compressor. A small supporting plate 30 may be mounted on piston rod between the nut 22 and the piston 21, and this plate supports the light springs 31, of which there are preferably three. The pressure of these springs against the valve 27 is sufficient to substantially carry its weight so that the inertia of this valve as the piston reverses its movement is sufficient to hold this valve against either the flange 32 on the ring 28 or against its seats. The thickness of these wafer valves and the distance the valve 27 is permitted to travel is only a few thousandths of an inch.

The operation of this structure is evident from the description thereof. The details and proportions of the various parts may all be changed by those skilled in the art without departing from the spirit of my invention as set forth in the following claims.

I claim:—

1. The combination of a piston, formed with circular valve seats, a disk valve on said seats, and circular means to limit the movements of said valve and contacting therewith, the diameters of the lines of contact between said limiting means and of the valve seat nearest its diameter being unequal for the purpose set forth.

2. The combination of a piston formed with a circular valve seat and longitudinal passages opening within said seat, a wafer valve mounted on the end of said piston, means to retain said valve, and resilient means carried by said piston tending to press said valve outwardly.

3. The combination of a piston formed with a circular valve seat and longitudinal passages opening within said seat, a wafer valve mounted on the end of said piston, means to retain said valve, and resilient means carried by said piston tending to press said valve outwardly, comprising light coil springs mounted in a plurality of said passages and engaging said valve, and a plate at the opposite end of said piston to serve as an abutment for said springs.

4. The combination of a piston formed with two circular concentric valve seats at one end and passages opening within the space between said seats, said piston being formed with a circumferential groove at the end adjacent said seats, a wafer valve mounted on said seats, a retainer ring mounted in said groove and embodying an interior circumferential flange extending over the edge of said valve to limit the movement thereof.

5. The combination of a piston formed with two circular concentric valve seats at one end and passages opening within the space between said seats, said piston being formed with a circumferential groove at the end adjacent said seats, a wafer valve mounted on said seats, a retainer ring mounted in said groove and embodying an interior circumferential flange extending over the edge of said valve to limit the movement thereof, the interior diameter of said flange on the retainer ring being greater than the exterior diameter of the outer valve seat so that when the valve becomes worn because of contacting with said flange and seat, it may be turned over.

6. The combination of a piston formed with two circular concentric valve seats at one end and passages opening within the space between said seats, said piston being formed with a circumferential groove at the end adjacent said seats, a wafer valve mounted on said seats, a retainer ring mounted in said groove and embodying an interior circumferential flange extending over the edge of said valve to limit the movement thereof, and coil springs mounted in said passages in the piston to press the valve against said retainer flange during the suction stroke of the piston.

7. The combination of a piston formed with longitudinal passages, a valve at the end of the piston to close said passages during the compression stroke, said piston being formed with circumferential grooves, and piston rings seated in said grooves, one of said rings being formed with an inwardly extending flange overlapping the edge of said valve to retain it and limit its movement.

HENRY J. BERRY.